(12) United States Patent
Villa

(10) Patent No.: US 11,180,381 B2
(45) Date of Patent: Nov. 23, 2021

(54) WATER TREATMENT SYSTEM

(71) Applicant: Walter Villa, Gorgonzola (IT)

(72) Inventor: Walter Villa, Gorgonzola (IT)

(*) Notice: Subject to any disclaimer, the term of this patent is extended or adjusted under 35 U.S.C. 154(b) by 475 days.

(21) Appl. No.: 16/049,936

(22) Filed: Jul. 31, 2018

(65) Prior Publication Data

US 2020/0039840 A1    Feb. 6, 2020

(51) Int. Cl.
| | |
|---|---|
| *C02F 1/02* | (2006.01) |
| *C02F 1/28* | (2006.01) |
| *C02F 1/00* | (2006.01) |
| *H05B 3/03* | (2006.01) |
| *H05B 3/82* | (2006.01) |

(52) U.S. Cl.
CPC ............ *C02F 1/02* (2013.01); *C02F 1/001* (2013.01); *C02F 1/008* (2013.01); *C02F 1/283* (2013.01); *H05B 3/03* (2013.01); *H05B 3/82* (2013.01); *C02F 2303/04* (2013.01); *C02F 2303/22* (2013.01)

(58) Field of Classification Search
CPC .. C02F 1/001; C02F 1/008; C02F 1/02; C02F 1/283; C02F 1/4602; C02F 2001/46152; C02F 2201/003; C02F 2201/006; C02F 2201/007; C02F 2201/46125; C02F 2209/055; C02F 2303/04; C02F 2303/22; C02F 9/005; C02F 2001/46133; C02F 2307/14; C02F 1/003; C02F 1/004; C02F 2001/46171; C02F 2201/4613; H05B 3/03; H05B 3/82

See application file for complete search history.

(56) References Cited

U.S. PATENT DOCUMENTS

| | | | | |
|---|---|---|---|---|
| 4,048,030 | A * | 9/1977 | Miller | ............... C02F 1/46109 |
| | | | | 205/701 |
| 8,562,803 | B2 * | 10/2013 | Nyberg | ............... C02F 1/46109 |
| | | | | 204/536 |
| 10,815,136 | B2 * | 10/2020 | Moon | ................. B01D 61/445 |
| 2007/0295667 | A1 | 12/2007 | Ruprecht | |
| 2008/0156711 | A1 | 7/2008 | Vitan et al. | |

FOREIGN PATENT DOCUMENTS

| | | | | |
|---|---|---|---|---|
| DE | 8224198 U1 * | 11/1982 | | ............... C02F 1/48 |
| IT | 1396612 B1 | 11/2009 | | |
| WO | WO-2017086657 A1 * | 5/2017 | | ............... C02F 1/00 |

OTHER PUBLICATIONS

The abstract of Figure of RU 2604211 C1 (Year: 2016).*
The abstract of KR2018046999A (Year: 2018).*

* cited by examiner

*Primary Examiner* — Terry K Cecil
(74) *Attorney, Agent, or Firm* — Dickinson Wright PLLC; Andrew D. Dorisio

(57) ABSTRACT

A water treatment device, preferably a device used for treating waters intended for a domestic and/or industrial use, includes a filtration apparatus and an ionization apparatus accommodated together in a container.

16 Claims, 5 Drawing Sheets

WATER TREATMENT SYSTEM

TECHNICAL FIELD

The present invention concerns a water treatment device, preferably a device used for treating waters for domestic use, capable of supplying waters substantially free of impurities and featuring a reduced tendency to form limescale, without depriving the same of the mineral elements naturally dissolved therein.

BACKGROUND OF THE INVENTION

By "water" or "waters" both the pure chemical compound ($H_2O$) and the liquid mixture formed of it with the substances internally dissolved thereto are commonly meant.

The so-called "raw" water, taken for instance from rivers, lakes, or springs, undergoes a process aiming at removing or modifying the undesired components (for instance pollutants or big sediments) before being distributed through civil and industrial water plants, intended for domestic, industrial, agricultural, or urban use in general. Moreover, the water for civil and industrial uses possibly undergoes further treatments in order to remove other impurities present therein, such as, for instance, thinner sediments (sand), microorganisms, fungi, algae. In particular, drinkable water shall be free from bacteria, mildews, algae, and in general from those substances which are harmful for human and animal organisms.

Such further treatments include, among others, the use of filtration and microfiltration systems, capable of restraining sediments, microbes, and turbidities present in water. For instance, filtering devices can be installed along water mains, upstream of the water main or of the plant to be safeguarded, thus forcing the water to be treated to pass through them.

US20080156711 and US20070295667 disclose, for instance, water treatment devices comprising cartridge filters, accommodated inside housings placed along water mains and connected thereto through a manifold. Generally, these housings can be disconnected from the manifold (hence from the water mains) for replacing the filtering cartridge.

As a matter of fact, the filters of the water treatment systems shall be frequently replaced. Also, they do not allow a satisfactory sanitization of waters, considering that microorganisms, mildews, and algae present in the filtered water can in any case proliferate and survive in contact with such cartridges and in the filtered water.

Therefore, a system for treating the waters of the civil and industrial water mains, capable of overcoming said problems, is highly desired.

Furthermore, a system is desired that is capable of simultaneously reducing or eliminating the limestone deposits, which typically form along the water mains, on the surfaces washed with running water and in the plants fed from the water main, thus damaging them.

As a matter of fact, it is known that when water is heated, the carbonate and the calcium present therein precipitate in the form of calcium carbonate salt; the precipitate progressively deposits and forms limescale. Such effect, which is a highly undesired one, is proportional to water hardness, a natural characteristic of water that is strictly bound to the presence of calcium and magnesium ions in solution. The most commonly used measuring unit of water hardness is French Degree (° F.), which corresponds to 10 mg/l of calcium carbonate.

The systems generally used for reducing water hardness are based on water softening, by means of chemical additives (for instance polyphosphate salts and acids) or by chemical-physical means (for instance ion exchange resins). However, such systems have a high impact on the environment, excessively increase the presence of potentially harmful ions, and/or excessively reduce the content of minerals naturally present in waters. Also, it is known that calcium carbonate might be beneficial to health; for instance, there are calcium carbonate-based dietary supplements. It is therefore preferred to prevent the formation of limescale, while keeping the calcium carbonate salt present in the treated waters.

By treating water with an electric field, it is possible to inhibit the formation of limescale and to reduce or eliminate the already formed scales. Without being bound to theory, it is here believed that such effect takes place thanks to the capability of an electric field of modulating the ratio of the calcium carbonate crystals in the rhombohedral form (calcite) to those in the rhombic-pyramidal form (aragonite). Whereas the formers tend to aggregate and form deposits, the latter don't accumulate and remain substantially suspended in water.

Document IT1396612 B1 describes a water treatment apparatus suitable for this purpose and comprising a tank internally to which there is a bar element that is connected to an electronic control unit and along which the water flows, being submitted to a negative magnetic flow. It is believed that the device according to IT1396612 B1 creates an electromagnetic field between a plurality of elements made from a conductive material, placed inside the bar element, and the walls of the tank, also made from a conductive material.

The present invention provides an improved, highly efficient, and cost-effective system for treating water, capable of performing water filtration and sanitization by means of a single device, being thus a compact device. The device according to the invention is also capable of meeting the needs for reducing or eliminating limescale.

BRIEF SUMMARY OF THE INVENTION

The present invention is thus directed to a water treatment device, preferably for treating the waters of a water main, preferably waters for domestic use, more preferably drinkable waters. In particular, such device is structured in such a way that it can be integrated within a hydraulic circuit, being arranged along a water distribution main.

By water main it is meant a set of hydraulic pipes suitable for distributing the waters of a water network. The distributed water is preferably for civil or industrial use, for instance for food or washing use, or for supplying domestic utilities (including toilets) or big or small electric appliances (for instance washing machines, dish washers, coffee machines).

The treated water, obtained by using a device according to the invention, is a highly pure water, being substantially free from sediments, limestone residues, and organisms, such as bacteria, algae, or mildews. Preferably, the treated water is pasteurized or sterilized water.

In a first aspect, the present invention is directed to a water treatment device comprising a water filtration apparatus, comprising a removable cartridge filter, and a water sanitization apparatus, comprising two electrodes electrically connected to a power supply unit; such device also comprises a container which houses said filtration and sanitization apparatuses; such device is connected to a water main and it is suitable for receiving from a first segment of said water main the water that flows therethrough, and for outputting the treated water in a second segment of said water main. The device is characterized in that the sanitization apparatus, that is integrable into a water treatment device that comprises a cartridge filter filtration apparatus, comprises an electrode featuring a helical shape, accommodated in a portion of the container external with respect to the cartridge filter, surrounding the latter.

The other electrode is preferably a bar electrode, accommodated in a portion of the container internal with respect to the cartridge filter, inside a longitudinal hole of the cartridge filter.

Preferably, said device is connected to the water main via a manifold; more preferably it is reversibly connected to the water main.

In a second aspect, the invention is directed to a water treatment system comprising at least two of the above-mentioned devices.

In a third aspect, the invention is directed to the sanitization apparatus as above.

Further characteristics and advantages of the invention will be evident from the description of a preferred but not exclusive embodiment of the invention, which is shown for illustrative hence non-limitative purposes in the attached drawings.

Figure 1:
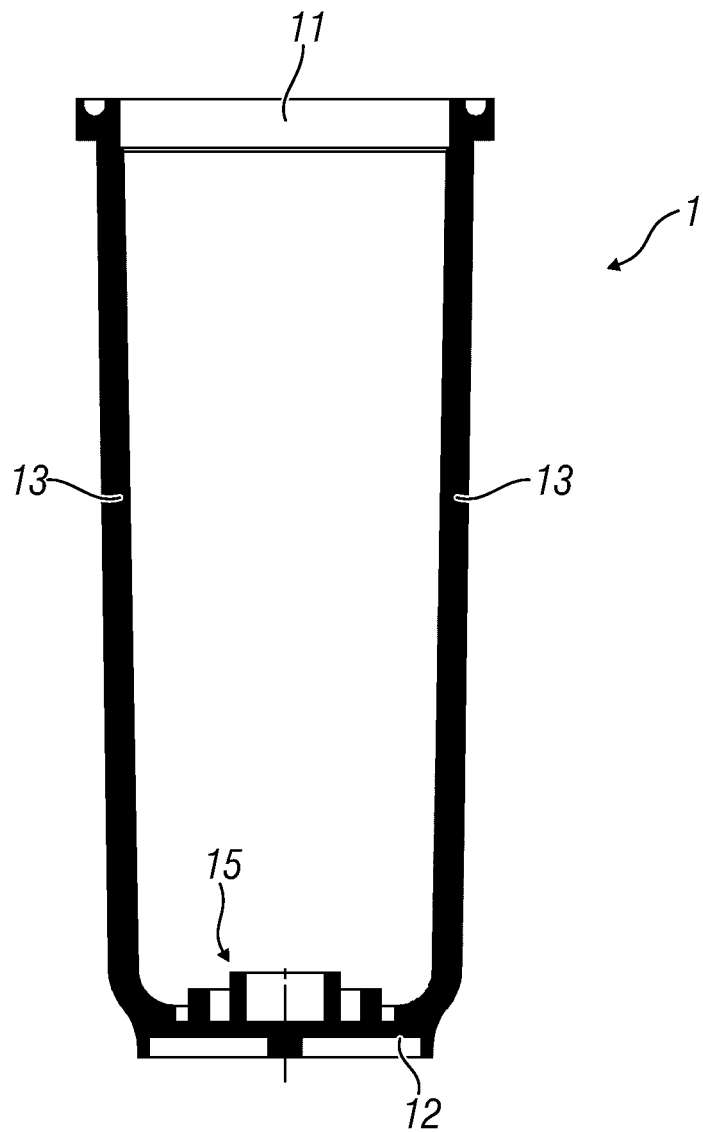
FIG. 1 is a vertically cross sectioned plane view of a container (1) of a device (100) according to the invention.

The container (1) of the device (100) according to the invention preferably features a substantially cylindrical shape and is hollow, being hence capable of accommodating a filtration apparatus (2) and a sanitization apparatus (3) according to the invention.

The container (1) is preferably connected to the water main through a manifold (4).

The container (1) comprises a base (12), transversal with respect to the walls (13) of the container and opposed with respect to an upper opening (11) of the container (1) facing the manifold (4). Preferably the base comprises locking means (15) for locking the filtration apparatus.

Preferably, said manifold (4) comprises an input port (41) connected to a first segment of said water main and an output port (42) connected to a second segment of said water main; said first and second segments of said water main being respectively located upstream and downstream of said device (100) and putting said water main in fluid communication with the device (100). Preferably, the water coming from the water main enters the device through the input port (41) of the manifold and leaves the device as treated water via the output port (42) of the manifold, for being re-injected into a second segment of the water main. Preferably the flow rate of the water that crosses a device according to the invention is equal to 300-5000 $m^3/h$, more preferably to about 1000 $m^3/h$.

Figure 2:
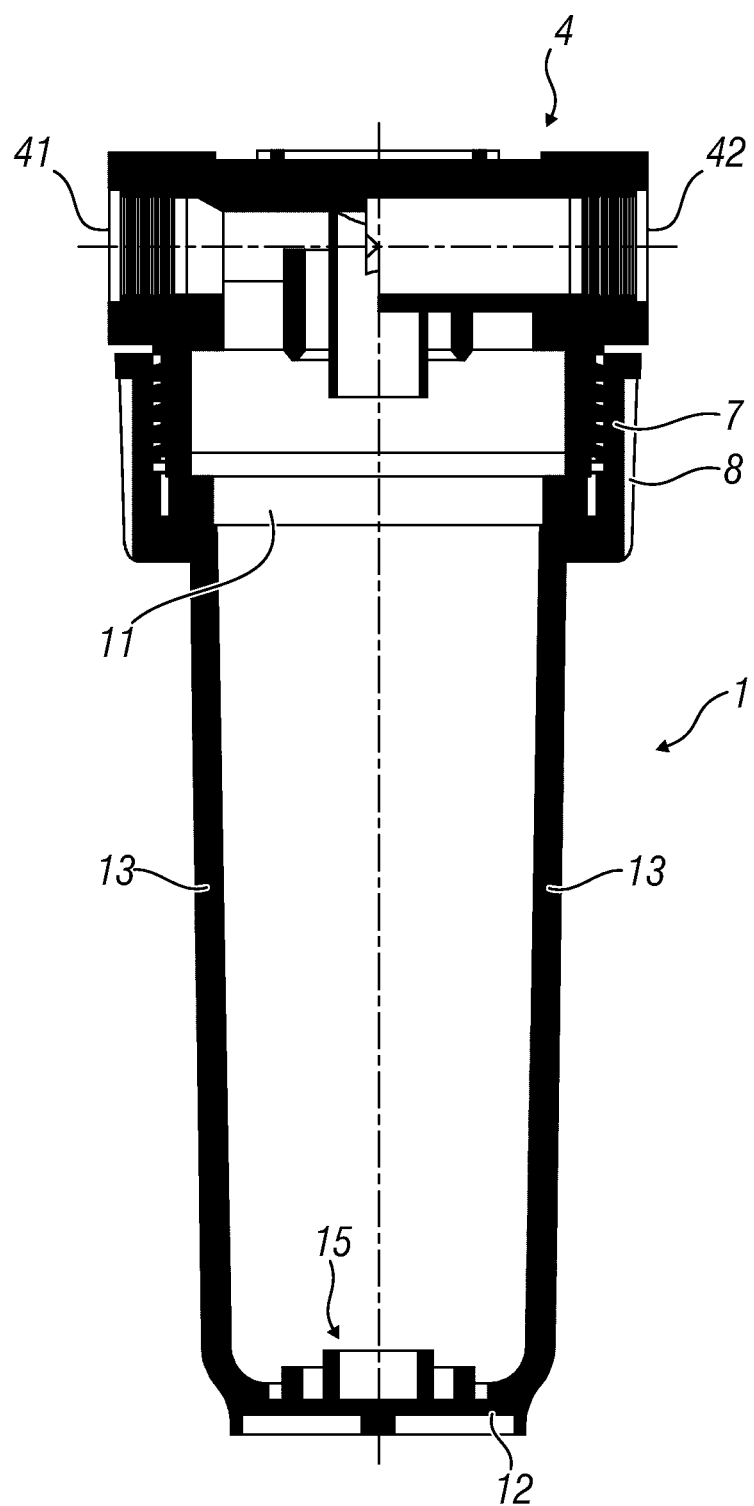
FIG. 2 is a vertically cross sectioned plane view of the container (1) connected to a manifold (4)
Figure 3:
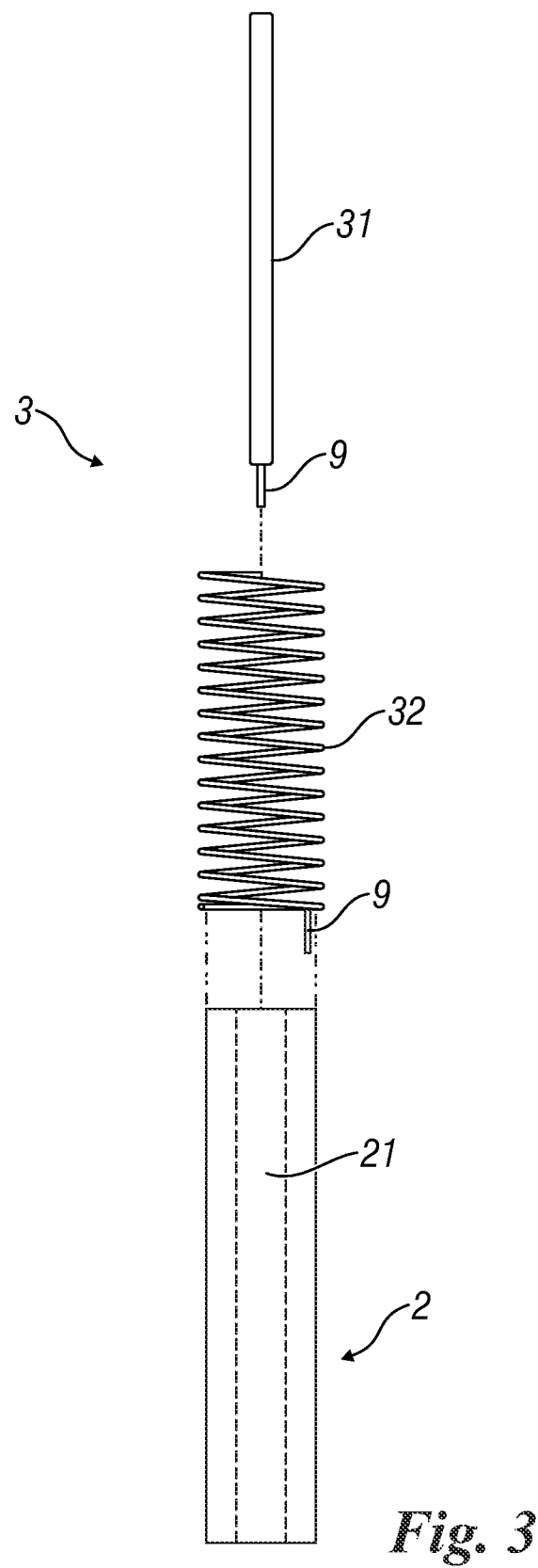
FIG. 3 is a vertically cross sectioned exploded view of a preferred embodiment of the filtration apparatus (2) and of the two electrodes (31, 32). A longitudinal central hole (21) of the cartridge filter is visible, internally to which the first electrode (31) is inserted.
Figure 4:
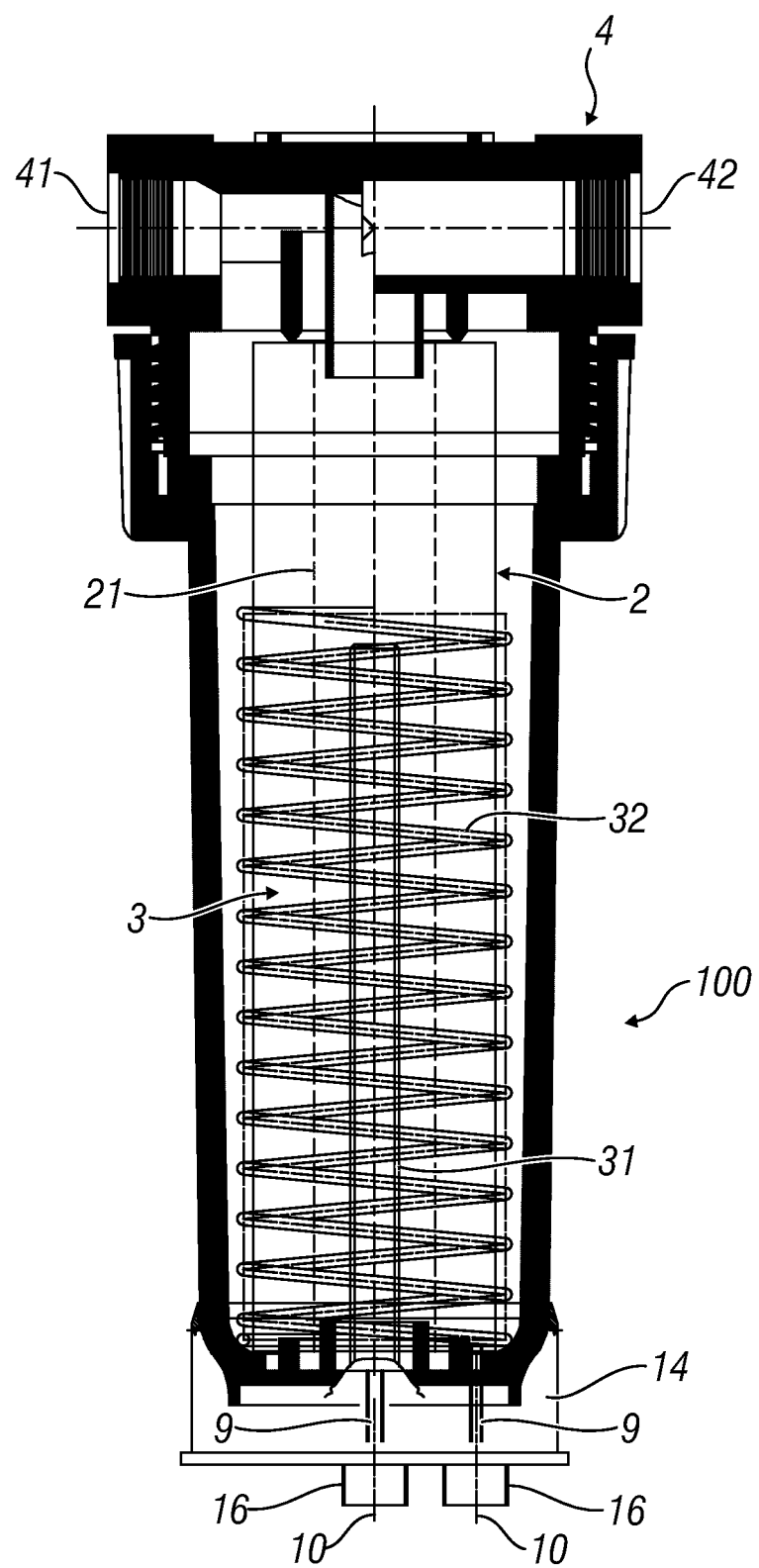
FIG. 4 is a vertically cross sectioned plane view of a preferred embodiment of the device (100) according to the invention, once assembled and connected to the manifold (4)
Figure 5:
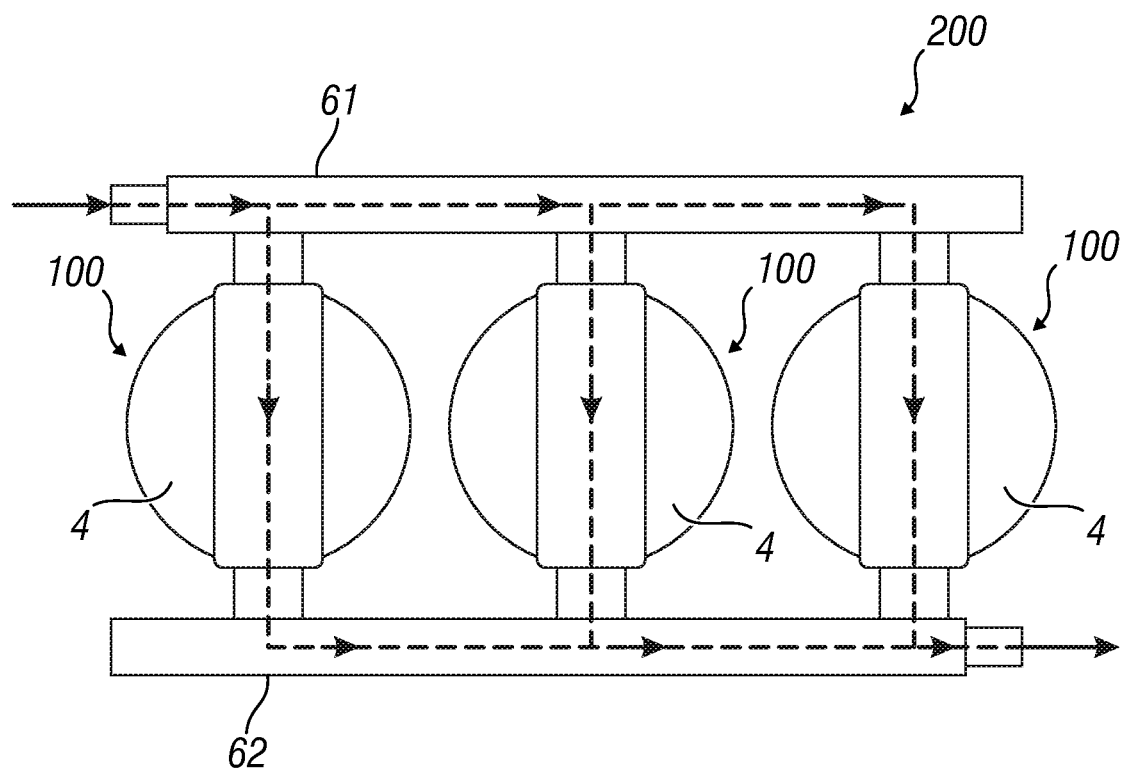
FIG. 5 is a horizontal plane view of a preferred embodiment of a system (200) according to the invention, comprising three devices (100) arranged in parallel, connected to two segments of a water main (61, 62) via their respective manifolds (4). The broken line arrows show the flow of water through the system (200).

The manifold (4) is preferably connected to the container (1) of said device (100) in reversible manner, preferably by way of a screw connection (7), preferably comprising a tightening ring nut (8), as shown in FIG. 2, so that said device can be easily disconnected from said water main by unscrewing the container (1) from the manifold (4).

Preferably, the container (1) has a height ranging from 100 to 600 mm, from 150 to 500 mm, or from 200 to 350 mm, even more preferably from 215 to 250 mm; preferably the height of the container is equal to about 160, 220, 235, 315, 360, 430, or 490 mm.

Preferably, the container (1) has an inner diameter ranging from 30 to 250 mm, from 50 to 100 mm; preferably the container has an inner diameter equal to about 60, 80, 100, or 130 mm.

Preferably, the container (1) of the device (100) according to the present invention is made from a transparent material, for instance a polymeric material having a high thermal resistance; more preferably the transparent material is a styrene-acetonitrile copolymer (SAN copolymer) (CAS Registration Number: 9003-54-7) or polypropylene, for instance polypropylene Moplen™, or co-polyester Tritan™, more preferably co-polyester Tritan™, for instance co-polyester Tritan™ TX1001 (manufactured by Eastman Chemicals Company).

The filtration apparatus (2) of the device (100) comprises a cartridge filter. The cartridge filter is capable of filtering out the impurities coming from the water main, such as rust particles, grains of sand, clay particles, etc. Preferably, the cartridge filter is a filter featuring a filtration degree less than or equal to 20 µm, less than or equal 10 µm, less than or equal to 5 µm, less than or equal to 1 µm.

Said cartridge filter has a cylindrical shape comprising a substantially central, longitudinal hole (21). The diameter of the cartridge preferably ranges from 20 to 100 mm, more preferably from 50 to 60 mm. The diameter of the longitudinal hole (21) preferably ranges from 15 to 40 mm, preferably from 20 to 40 mm. Preferably, the ratio of the diameter of the cartridge filter to the diameter of the central hole equals about 1.5, about 2, about 2.5. Preferably, the height of said cartridge filter ranges from 50 to 450 mm, more preferably from 100 to 450 mm, and even more preferably from 200 to 300 mm.

Preferably, the water that enters said container (1) flows externally to said filtration apparatus (2), then it crosses it tangentially and leaves it, having been filtered, by flowing along said longitudinal hole (21), and subsequently through the output port (42) of the manifold.

Preferably, the cartridge filter (2) according to the present invention is removable. The removable cartridge filter can be replaced by a new cartridge filter once exhausted.

Preferably, the cartridge filter (2) according to the present invention is a wire wound filter cartridge, the wire being preferably made from polypropylene, or it is an activated charcoal cartridge; optionally the wire wound filter cartridge is coated by an epoxydic resin.

Preferably, the sanitization apparatus (3) of the device according to the present invention comprises a first electrode (31) accommodated in a central portion of the container (1), arranged inside the longitudinal hole (21) of the cartridge filter (2); preferably, said first electrode (21) is a bar electrode which longitudinally runs said hole (21) of said cartridge filter, preferably all along its height; preferably, the height of said first electrode (31) is less than or equal to the height of said cartridge filter. Preferably, the diameter of said bar electrode is about equal to half the diameter of the longitudinal hole of the cartridge filter. More preferably said electrode has diameter equal to about 12 mm.

The sanitization apparatus further comprises a second electrode (32), preferably accommodated in a portion of the container (1) comprised between the inner perimeter of said container and the outer surface of said cartridge filter. Said second electrode (32) has a helical shape and surrounds said cartridge filter (2), preferably about all along the height of the filter or along at least a part of the height of the cartridge filter, preferably by about two thirds of the height of the cartridge filter. Preferably, the height of said helical electrode (32) ranges from 150 to 300 mm, more preferably from 170 to 200 mm; preferably, the length of said electrode (32) ranges from 2 to 5 m, more preferably from 3 to 4 m. Preferably, the pitch of the helix of said helical electrode is such as to make said cartridge filter visible from outside when inserted inside the helical electrode. Preferably, the diameter of the outer disc that is produced by the helix ranges from 50 to 70 mm, more preferably is equal to about 65 mm. Preferably, water flows along the helical electrode (32), according to a spiral motion, and covers a distance of about 3 m from the input up to the output.

Preferably, the surface of at least one of said two electrodes (31, 32) is threaded; said threaded surface is capable of accumulating charges all along the length of the electrodes, with respect to a smooth surface. Moreover, it can increase the turbulence of the water hydraulic flux, thus increasing the residence time of the water to be treated within the device.

Preferably, the electrodes (31, 32) of the sanitization apparatus of the device according to the invention are made from stainless steel, more preferably from AISI 316L steel, or from silver-plated brass.

Said electrodes (31, 32) of the sanitization apparatus of the device of the invention are preferably electrically connected to one and the same power supply unit, each via a connector (9) connected to one end of the electrode and connected to the electronic control unit through an electric wire (10); preferably, said connector (9) crosses the base (12) of the container (1).

Preferably, the container (1) also comprises an insulating element (14) below said base (12), wherein at least a portion of each connector (9) is accommodated, electrically insulated from the outside of the container; such insulating element (14) comprises the elements used for establishing an electrical connection to the power supply unit (16).

Preferably, the device (100) according to the present invention comprises an electronic control unit connected to the power supply unit and to the electrodes. Said electronic control unit receives normal single-phase electric power, of 220 Volt (V) of voltage and 50 Hertz (Hz) of frequency; an electronic circuit, programmable by means of a dedicated software, generates an electric voltage at the output ranging from 110 to 160 V, preferably equal to about 150 V. The electric peaks generated at the output from the electronic control unit feature a square waveform, having duration (in the order of milliseconds) such as to substantially be a so-called spike wave. The electric peaks of the spike wave pulses are such as to inhibit the multiplication and survival of microorganisms (bacteria), mildews, or algae present in the treated water, which would otherwise be harmful to health if ingested or put in contact with skin.

The electrodes are preferably contained inside a container made from a polymeric material, and consequently they are electrically insulated.

Preferably, said electronic control unit is programmed so as to periodically invert the polarities of the two electrodes. For instance, at a given instant 1 the first electrode operates as an anode and the second electrode operates as a cathode, whereas at the time 1+x the first electrode operates as a cathode and the second electrode operates as an anode. In this way, any limescale deposited on the cathode is released in water when it starts operating as an anode.

Preferably, said electronic control unit automatically regulates the power supplied to the electrodes as a function of water hardness, i.e. on the basis of the electrical conductibility of water: said electronic control unit preferably measures the electrical conductibility of the water where the electrodes are immersed in, via the latter; if said conductibility is greater than a threshold value, then the electronic control unit supplies power to the electrodes.

Conductibility is the capacity of a solution of conducting an electric current and is measured in microsiemens per centimeter ($\mu Scm^{-1}$) at a temperature of 20° C. It is directly proportional to water hardness, in that the concentration of the mineral salts dissolved in water determines water conductibility. The device according to the invention is capable of reducing water hardness within the desired values by using the sanitization apparatus.

Preferably, said electronic control unit is programmed to perform, at least once a day, for instance for 1 hour every 24 hours, a pasteurization and/or sterilization cycle of water and device by means of the electrodes, providing high voltage electric pulses; for instance the electric pulses may be of from 110 to 160 V, preferably equal to about 150 V, for a time interval in the order of seconds, for instance of 1, 5, or 10 seconds, or the electric pulses may be of about 10.000 Volts or more, with 5 mA intensity and last for a time interval in the order of milliseconds (msec), for instance of about 500 msec; such high voltage electric pulses can heat the water present in the container to a temperature ranging from 60° to 100° C., preferably ranging from 80° C. to 100° C.

Said device also determines a low electric power consumption, less than 40 Watts/hour (W/h), preferably equal to about 20 W/h.

The water treatment system (200) according to a second preferred aspect of the invention comprises at least two of the above-described devices (100) connected to one and the same water main; preferably, the sanitization apparatuses (3) of said at least two devices are electrically connected to one and the same power supply unit. Preferably, said at least two devices are all connected to one water main, each via its own manifold (4). In particular, all devices (100) of the system (200) are connected to a first segment of the water main, that is placed upstream of the devices, via a first connecting pipe connected to the input port of the manifold (4) and are connected to a second segment of the water main, that is placed downstream of the devices, via a second connecting pipe (62) connected to the output port of the manifold (4). Preferably, said first pipe (61) conveys the water to be treated from the first segment of the water main to all the devices (100) of the system (200) simultaneously, and said second pipe (62) distributes the treated water to the second segment of the water main.

Preferably, said at least two devices are not in a fluid connection to each other. For instance, preferably the first and second pipes (61, 62) are placed perpendicularly to the longitudinal axis of the input port (41) and output port (42) of the manifold (4) and are blind at one end, so that water simultaneously enters and leaves the at least two devices arranged in parallel to each other.

Preferably, said water treatment system comprises three devices according to the invention arranged in parallel to each other, connected to one and the same water main and receiving electric power from one and the same power supply unit; more preferably said system comprises a number of devices equal to 3 or multiples of 3, wherein said devices receive electric power from one electronic control unit every 3 devices.

The sanitization apparatuses of said at least two devices are preferably electrically connected together to one and the same power supply unit.

The advantages of the device according to the present invention are numerous. Besides being capable of reducing or eliminating limescale, a device according to the invention is capable of eliminating the impurities present in the water to be treated, such as for instance rust particles, grains of sand, clay particles, etc., through the filtration apparatus, while simultaneously sanitizing the water that flows through it, by means of the sanitization apparatus; indeed, said device prevents the survival and proliferation of microorganisms, fungi, and algae.

In addition, the presence of the sanitization apparatus in correspondence with the filtration apparatus (i.e. inside one and the same container) considerably increases the lifetime of the cartridge filter, up to ten times longer compared to the devices of the prior art, thus preventing an early deterioration due to the proliferation of bacterial masses, fungi, and algae on its surface. The water that leaves the device of the invention is consequently a treated water, substantially free from sediments, impurities, microorganisms, fungi, or algae. Finally, the sanitization apparatus being fully contained inside a container made from a non-conductive material is such that there are no electrically conductive parts harmfully exposed.

Also, the helical shape of the outer electrode is particularly advantageous as it increases the path of the flowing water, thus increasing the efficiency of water sanitization and the durability of the cartridge, still making the cartridge visible when the device is assembled.

The device is also easy to maintain; as a matter of fact, since the cartridge filter is visible, it is possible to monitor its wear and tear status without disassembling the device.

The above-described effects are surprisingly achieved by means of a device that is structurally simple and easy to install; it is also suitable for replacing or being integrated in already installed standard systems; for instance, the sanitization apparatus (3) according to the invention can be integrated in standard devices comprising cartridge filters and pre-existing containers, or the device (100) can fully replace systems of the prior art while keeping the manifold unchanged.

Finally, the average electric power consumption of the device is extremely low, namely less than 40 Watt/hour.

The invention claimed is:

1. A water treatment device, comprising:
    a) a container (1) reversibly connected to a water main via a manifold (4), the manifold positioned at an upper portion of the container and comprising an input port (41) and an output port (42);
    b) a water filtration apparatus (2) comprising a cartridge filter having a cylindrical shape; and
    c) a water sanitization apparatus (3) comprising two electrodes (31, 32), connected to an electric power supply unit via respective electrical connections positioned at a lower portion of the container;
    wherein said filtration apparatus (2) and said sanitization apparatus (3) are accommodated together inside said container (1);
    wherein a first electrode (31) of the water sanitization apparatus (3) is a bar electrode and is accommodated in a portion of the container (11) internal with respect to the cartridge filter, inside a longitudinal hole (21) of the cartridge filter, and a second electrode (32) is an electrode having a helical shape and surrounding at least a major portion of said cartridge filter, said second electrode (32) being accommodated in a portion of the container (1) comprised between an inner perimeter of said container (1) and an outer surface of said cartridge filter, said second electrode positioned adjacent said outer surface and causing water to flow along the helical electrode according to a spiral motion before passing through said cartridge filter, and
    wherein the container (1) is adapted to cause water entering through the inlet port (41) to flow externally to said filtration apparatus (2), then cross the filtration apparatus (2) tangentially and exit the filtration apparatus (2), having been filtered, and flow along said longitudinal hole (21) through the outlet port (42).

2. The device according to claim 1, wherein said cartridge filter is a wire wound cartridge or an activated charcoal cartridge.

3. The device according to claim 1, wherein the first electrode (31) of said sanitization apparatus is accommodated in a central portion of the container (1).

4. The device according to claim 3, wherein said first electrode (31) is longitudinal with respect to said hole (21), and wherein a height of said first or second electrode (31, 32) is less than or equal to the height of the cartridge filter.

5. The device according to claim 1 wherein said container (1) is made from a transparent material.

6. The device according to claim 1 wherein said container (1) is made from a polymeric material.

7. The device according to claim 1 wherein said container (1) is made from a co-polyester polymer.

8. The device according to claim 1 wherein at least a portion of the filtration apparatus (2) is visible from outside the container (1).

9. The device according to claim 1 wherein a surface of at least one of the two electrodes (31, 32) of the sanitization apparatus (3) is threaded.

10. The device according to claim 1 wherein said two electrodes (31, 32) are made from stainless steel or from silver plated brass.

11. The device according to claim 10, wherein said two electrodes (31, 32) are made from steel AISI 316L.

12. The device according to claim 1 further comprising an electronic control unit electrically connected to the two electrodes (31, 32) and programmed to periodically perform a pasteurization or sterilization cycle of the water and of the container by means of the two electrodes (31, 32).

13. The device according to claim 1 comprising an electronic control unit electrically connected to the electrodes (31, 32) and programmed to periodically invert the polarities of the two electrodes.

14. A water treatment system (200) comprising at least two devices (100) according to claim 1, arranged in parallel.

15. The water treatment system (200) of claim 14, comprising at least three devices (100), arranged in parallel.

16. The device according to claim 1, wherein the first electrode comprises a linear bar electrode.

\* \* \* \* \*